United States Patent [19]

Vicino

[11] Patent Number: 5,626,814

[45] Date of Patent: May 6, 1997

[54] METHOD OF MAKING A SELF-INFLATING STRUCTURE

[76] Inventor: Robert K. Vicino, 6064 Mohler St., San Diego, Calif. 92120

[21] Appl. No.: 560,842

[22] Filed: Nov. 20, 1995

[51] Int. Cl.$^6$ .......................... B29C 41/04; B29C 51/10; B29C 51/14
[52] U.S. Cl. .......................... 264/511; 264/553; 264/162; 264/309; 264/311; 264/321; 264/344; 156/292
[58] Field of Search .......................... 264/321, 344, 264/511, 311, 553, 309, 162; 156/292

[56] References Cited

U.S. PATENT DOCUMENTS

| | | | |
|---|---|---|---|
| 2,793,399 | 5/1957 | Gallay et al. | 264/344 |
| 3,476,844 | 11/1969 | Villain | 264/344 |
| 4,263,843 | 4/1981 | Hammersmith et al. | 264/344 |
| 4,450,129 | 5/1984 | Dunn et al. | 264/344 |
| 4,454,248 | 6/1984 | Pollock et al. | 264/321 |
| 4,764,238 | 8/1988 | Dastin et al. | 264/321 |
| 5,196,242 | 3/1993 | Vicino | 428/12 |
| 5,284,608 | 2/1994 | Vismara | 264/321 |
| 5,401,456 | 3/1995 | Alesi, Jr. et al. | 264/321 |

*Primary Examiner*—Allan R. Kuhns
*Attorney, Agent, or Firm*—Henri J. A. Charmasson; John D. Buchaca

[57] ABSTRACT

A self-inflating structure consists essentially of a block of open-cell, resiliently compressible, foam material which has been shaped to a desired form and covered with an airtight envelope having a sealable aperture. The structure can be pressed to expel any air or other fluid out of the foam material and any internal void through the aperture. The structure is kept pressed or the aperture is sealed in order to keep it in its collapsed state. Upon release of the pressing form or the opening of the aperture, the block of foam bounces back to its original state sucking in ambient air and restoring the structure to its full size. The method for shaping the foam block includes extruding, machining, and carving with patterned sets of blades or burning wires.

26 Claims, 6 Drawing Sheets

METHOD OF MAKING A SELF-INFLATING STRUCTURE

FIELD OF THE INVENTION

This invention relates to inflatable structures and more particularly to foam-based self-inflating objects.

BACKGROUND OF THE INVENTION

In my U.S. Pat. No. 5,196,242 which is incorporated herein by this reference, I have disclosed a series of self-inflating structures made of compressibly resilient foam molded to particular shapes.

The main advantages of those inflating structures is that they can be compressed to a fraction of their size for storage or shipment, then allowed to return to their normal size on demand without having to be fed pressurized fluid. The resilient character of the compressed foam body provides the energy necessary to return the structure to its normal unpressurized size.

The instant invention results from an attempt to improve the compressibility and size restoring potential of such structures through improved manufacturing techniques and choice of materials.

SUMMARY OF THE INVENTION

The principal and secondary objects of this invention are to provide an improved type of self-inflating structures with a higher ratio of free-standing size over compressed volume, shorter inflating periods and expanded ranges of configuration and applications.

These and other valuable objects are achieved by new manufacturing methods and choice of foam materials, including various types of mechanical shaping of the foam core, new methods for the formation, texturing and decorating of the airtight envelope, and use of reticulated and other high resilience foam materials.

DESCRIPTION OF THE PREFERRED EMBODIMENT OF THE INVENTION

Figure 1:
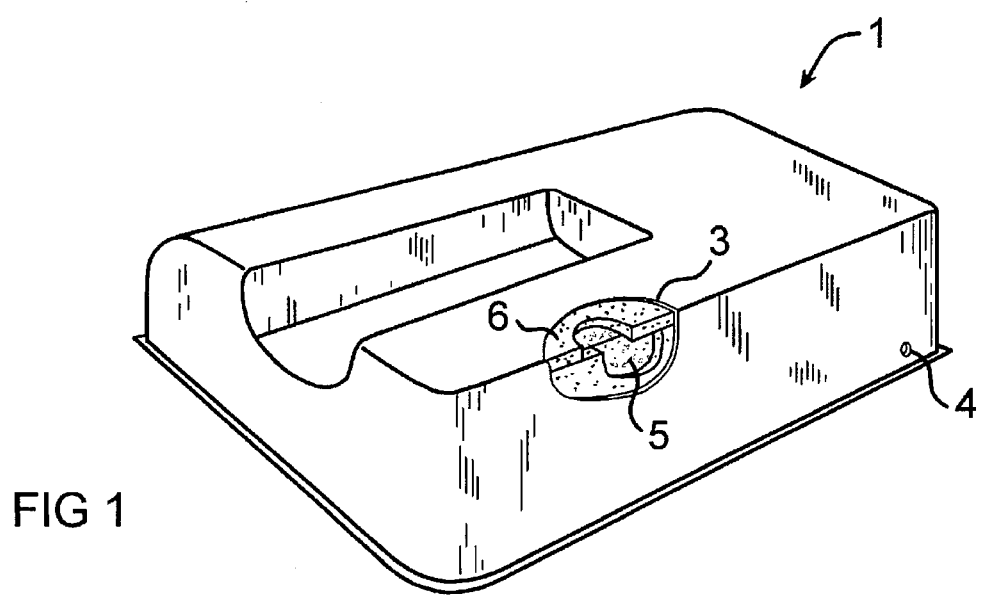
FIG. 1 is a perspective view of a self-inflating structure according to the invention.
Figure 2:
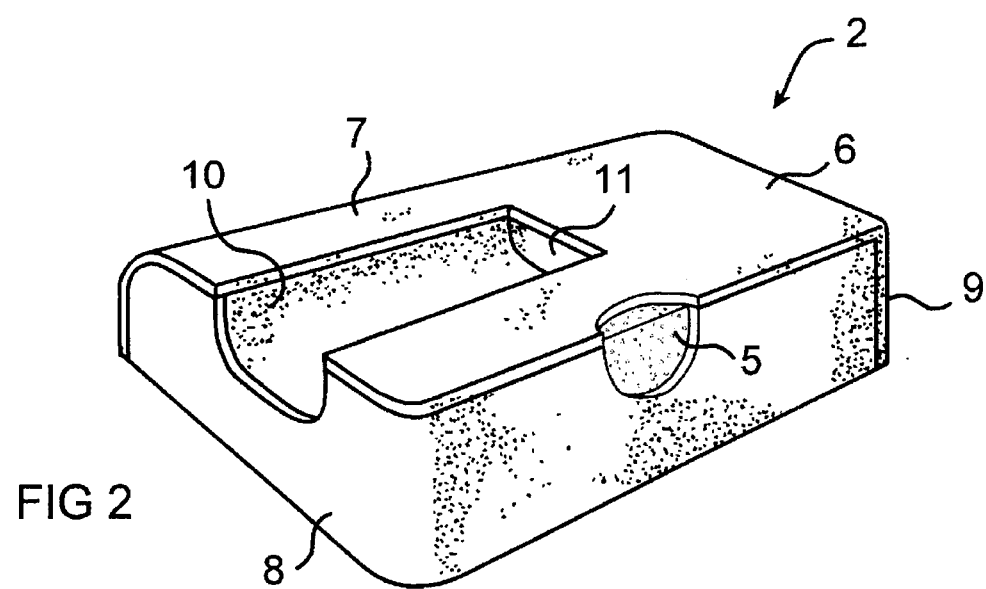
FIG. 2 is a perspective view of the resilient foam core structure.
Figure 3:
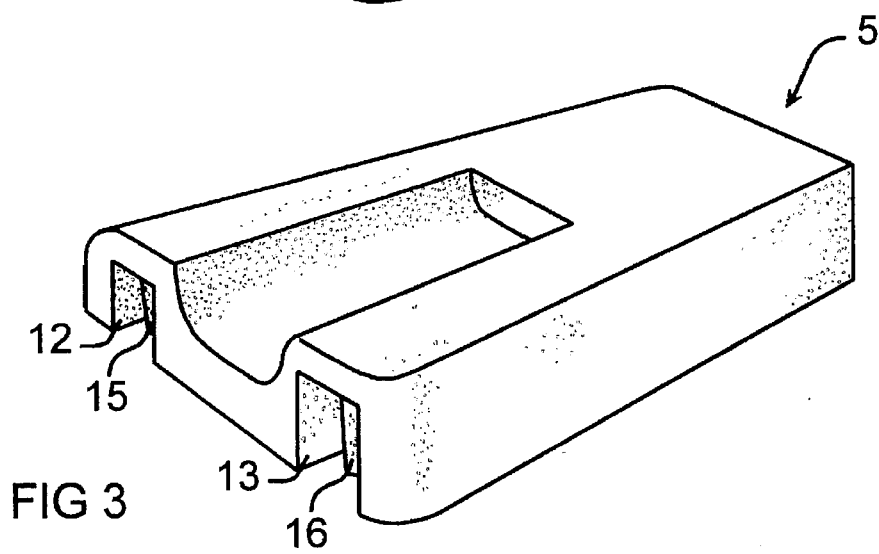
FIG. 3 is a perspective view of the central block.
Figure 4:
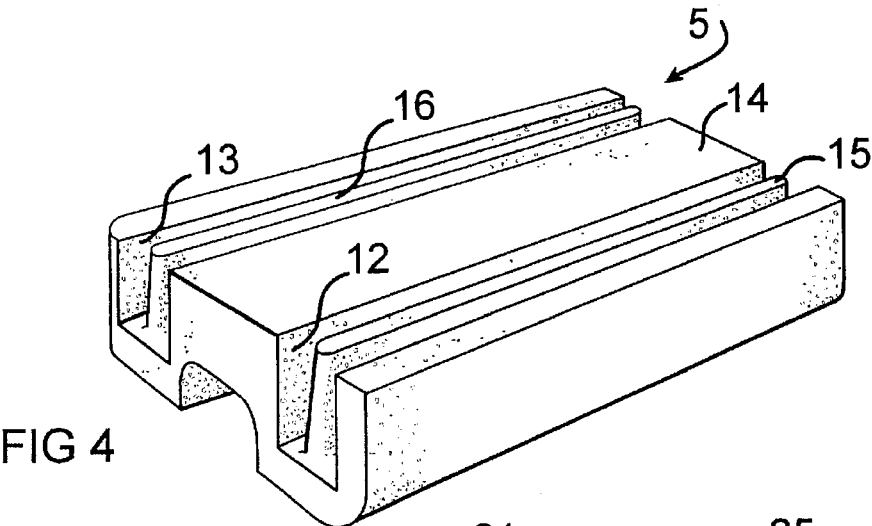
FIG. 4 is an inverted perspective view thereof.
Figure 5:
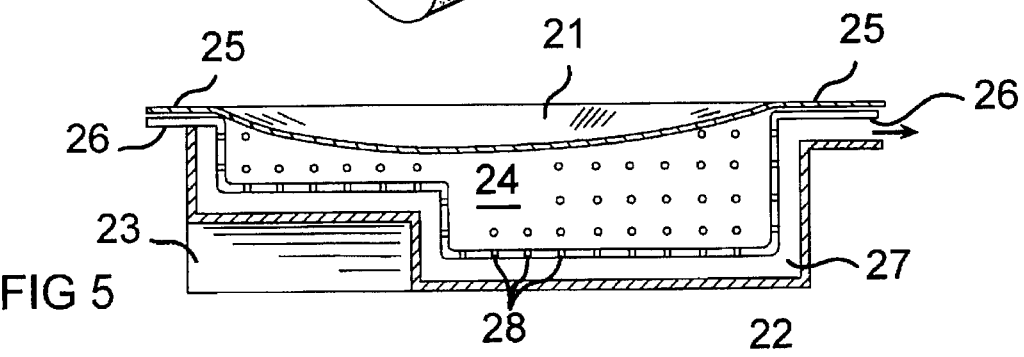
FIG. 5 is a diagrammatical cross-section of an envelope-forming mold.
Figure 6:
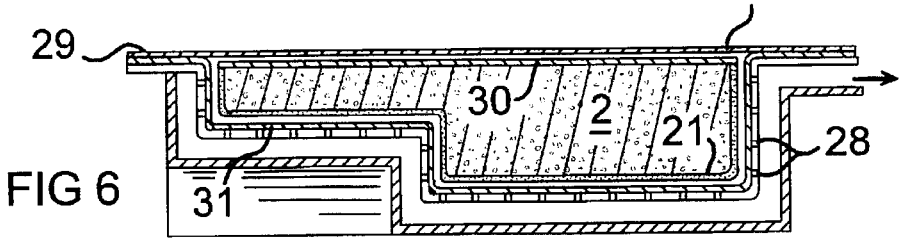
FIG. 6 is a diagrammatical cross-section of the loaded mold.

Referring now to the drawing, there is shown a self-inflating structure 1 of a complex geometry specifically selected to illustrate the various improvements in manufacturing methods.

The structure 1 comprises a core 2 of resiliently compressible synthetic foam material inserted in an envelope 3 made of airtight, pliable sheet material. The envelope has an air-bleeding aperture 4. The core is made from an open-cell polyurethane which can be of a ester or ether type. A polyether type of foam is preferred because of its low compression set and low cost. The foam material can be an open-cell type where air can circulate from one pore to another. A reticulated or high resilience-type of open-cell foam is preferred. A reticulated foam is one in which the walls of the cells have been exploded into skeletal strands to create uniform voids in 97% of the foam total volume. This type of foam is available in pore size ranges from 4 to 36 pores per linear centimeters (10 to 90 pores per linear inch) from FOAMEX of Eddystone, Pa. These reticulated foam products have been developed for use in filters, cushioning and sealing devices, sound insulation, vibration isolation, scrubbing, applying and wicking implements, and various other mechanical applications.

Non-reticulated HR (high resilience) foams are usually made of polyether polyurethane for use as a cushioning element. A HR foam having a fifty percent compression set of less than 10, a twenty-five percent Indentation Force Deflection (IFD) of more than 14 Kg/320 square centimeters (30 lbs/50 square inch); and a density of 24 to 40 kilograms per square meter (1.5 to 2.5 lbs/Ft$^3$) is preferred. The fifty percent Compression Set is a measure of the deformation of a foam after it has been compressed to half its original thickness between two metal plates for 22 hours at 70° C. (158° F.). It measures the percentage of thickness that remain "set" i.e., that it did not recover.

The twenty-five percent IFD is the load-bearing capacity or firmness of a foam when reduced to 25% of its original thickness.

The reticulation of open-cell foam is performed as part of the fabrication process of large continuous slabs. Non-reticulated HR foams are also manufactured in large slabs under tightly controlled conditions. These foams cannot be practically manufactured into specifically shaped small structures. Accordingly, if these foams are to be used in making self-inflating structures, the molding techniques such as the ones disclosed in my U.S. Pat. No. 5,186,242 are not available. Instead, the reticulated or HR foam core of a self-inflating structure must be cut out of the original slab of foam and shaped to the desired configuration before being covered by, or inserted into the airtight envelope. The manufacturing methods described herein are equally applicable to structures made of reticulated foam and those made of non-reticulated HR foam.

In the structure of the preferred embodiment 1 the core is a composite of two grades of foam material. The central block 5 is a relatively coarse foam having a low pore count, typically 4 to 8 pores per linear centimeter (10 to 20 pores per linear inch). The central block 5 is covered by a padding layer 6 made of a finer grade of foam having a high pore count, typically 16 to 24 pores per linear centimeter (40 to 60 pores per linear inch). The padding layer 6 offers two advantages. First, it provides for a smoother outer surface. Second, it yields firmer and sharper angular features than could be obtained with a lower pore count foam. In some cases, it has been found advantageous to use a coarser foam for the bulk of the structure, and the fine foam for a thin surface layer. In some applications it may be advantageous to bond the thin layer of high pore count material to the inside surface of the sheet material used to make the envelope 3 rather than applying it to the foam core 2.

The sections 7,8,9,10 and 11 of the padding layer 6 can be easily manufactured by die-cutting or stamping them out of a thin mat of material before being glued together. In a simpler configuration a single section of padding layer might be sufficient. Depending upon the complexity of the central block 5, it can be shaped by extrusion, stamping, die-cutting, compression cutting, machining, by abrasion grinding or shaving on a lathe-machine, by slicing, sawing, carving or heat-singeing or any combination of the above.

The amount of material used in the block can be reduced by creating one or more large void or cavity within the material itself or in the supporting surface of the structure. In the preferred embodiment 1, cavities 12,13 are carved into a portion of the supporting undersurface 14. However, pillars 15,16 are positioned within the carved cavities 12,13 to provide some support and maintain the integrity of the block. Depending upon the shape and dimensions of the core, different types of integral reinforcements may be incorporated such as beams, gussets, or areas of increased thickness as may be required. Alternatively, the core may be formed in pieces which are later bonded together. These pieces may already form a void, due to their shape, or be carved. The principal advantage of reducing the amount of material used in the core 5 is to provide a higher degree of compressibility, i.e., to allow the structure to be pressed to a smaller volume.

The carving of complex shapes is preferably done by means of a carving element or elements such as one or more blades or heated wires which are run through the foam. Depending on the desired shape, a single blade or wire having a straight or curved shape may be traversed through the slab in one or more directions. For example, a convex half cylinder shape may be created by a single half-circular curved blade or hot wire passing through the foam block in a first direction, then passing a single rectangular-shaped blade or hot wire through the block in a direction perpendicular to the first direction. Other complex shapes may be formed by traversing the carving element or elements through the foam along one or more complex, sinuous paths.

Alternately, a set 17 of parallel and slightly set-apart blades which are patterned to form a matrix 18 corresponding to the external outline of the top surface of the block 5. The cutting edges of the blades may be toothed or razor-sharp. While the set of blades is translated toward and into a slab of foam material, it is oscillated or rotated in a circular pattern 19 perpendicular to the translating movement of the blades. The oscillating amplitude or rotational diameter are approximately equal to the spacing between the blades so that no material is left unremoved over the entire path of the blade set.

Figure 8:
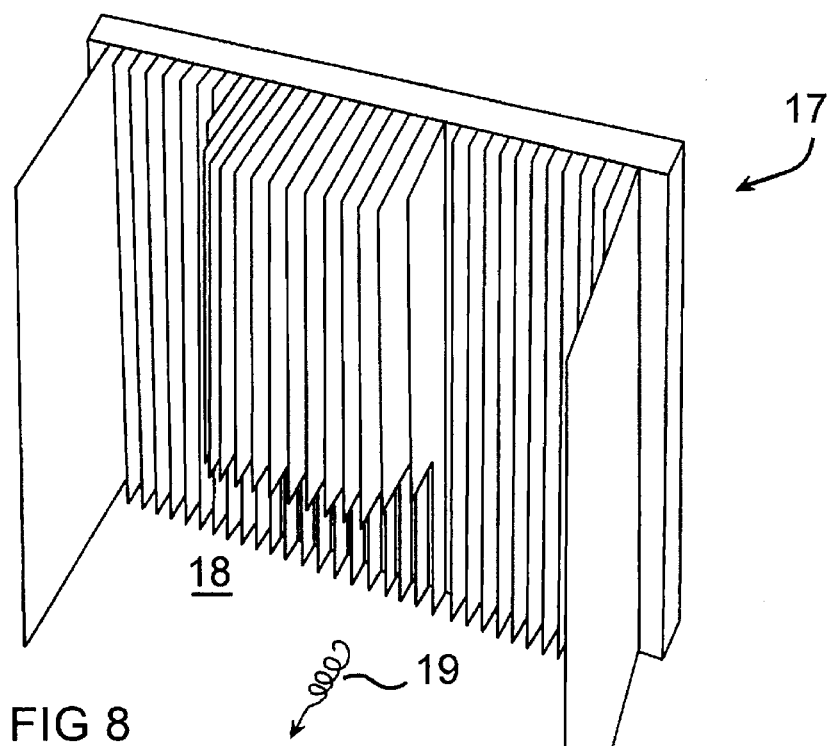
FIG. 8 is a perspective view of a set of foam carving blades.
Figure 8A:
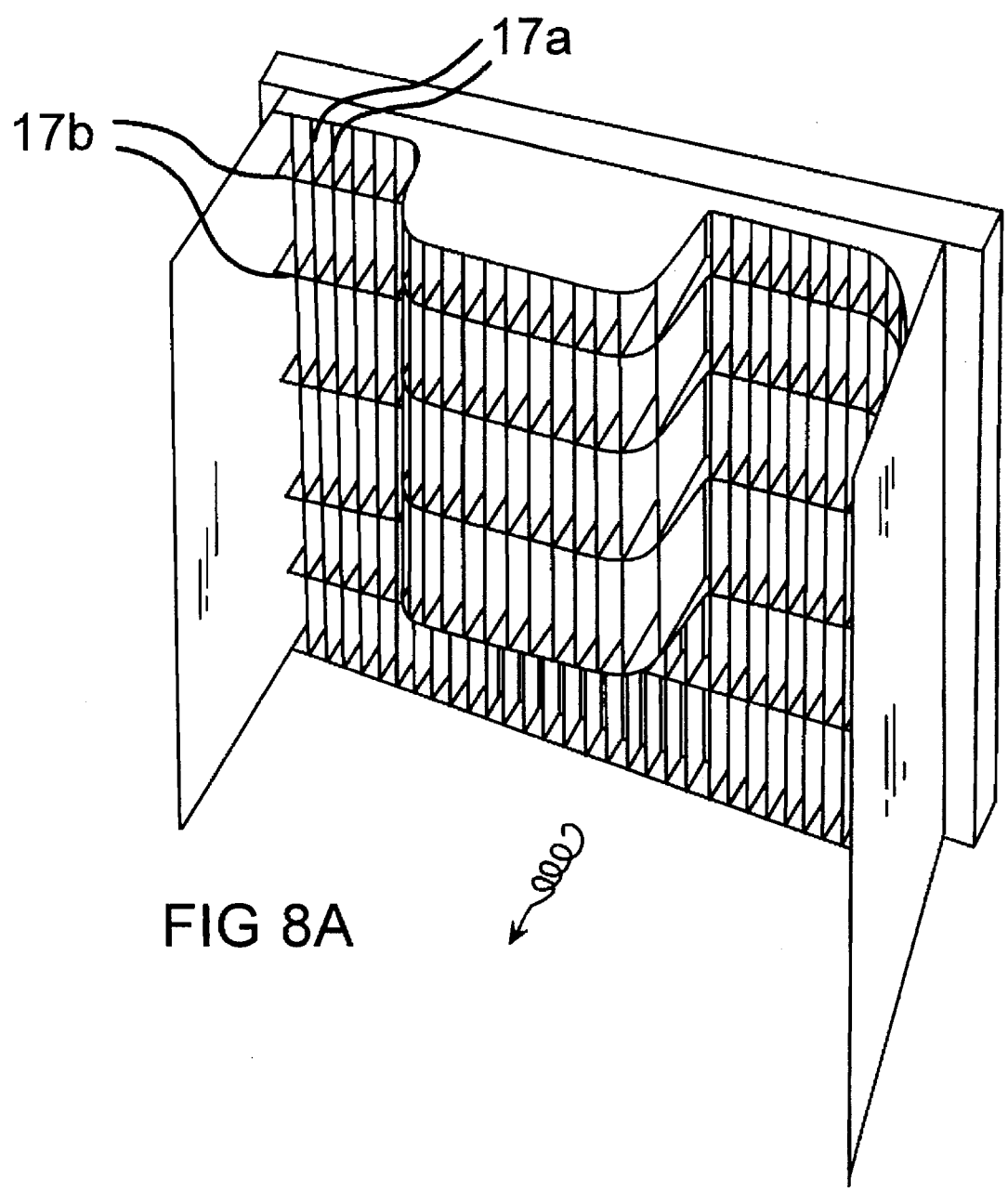
FIG. 8A is a perspective view of two perpendicular sets of foam carving blades.

Alternately, as shown in FIG. 8A, two sets of parallel blades 17a, 17b running perpendicular to each other may be used to form a honycombed carving structure. Although somewhat more costly, this structure serves to more effectively overcome lateral strength in the foam during cutting and provide a smoother surface.

Alternately, the carving can be done with a set of hot heating elements such as wires 20 forming the same pattern as would be formed by the cutting edges of the blades so as to burn rather than saw off the unwanted material. Once plunged into the core, this assembly may then be traversed longitudinally to cut off the slices created by the plunging motion.

Figure 10:
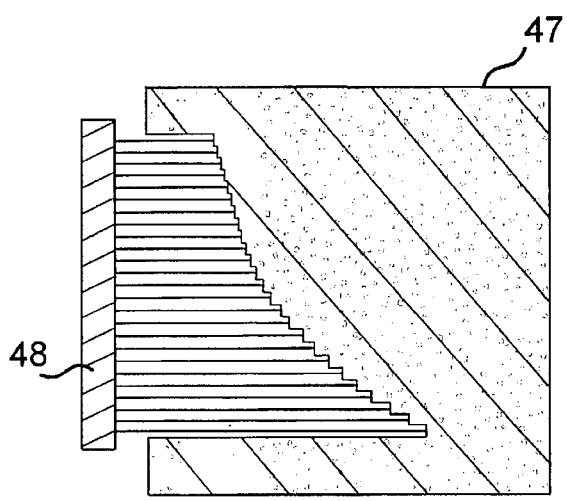
FIGS. 10 and 11 are diagrammatical illustrations of core-shaping sequences with sets of carving blades or burning wires.
Figure 11:
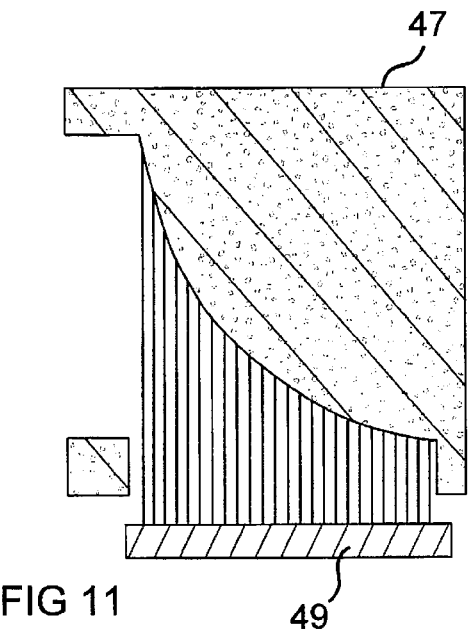

As shown in cross-section in FIGS. 10 and 11, when carving complex shapes out of a slab of foam 47 it may be advantageous to use two sets 48, 49 of blades or heated wires applied sequentially in directions perpendicular to each other with or without oscillating the sets. This method yields smoother, rounded surfaces as the staircase texture left by the first set of blades or wires is practically eliminated by the second set.

Figure 11A:
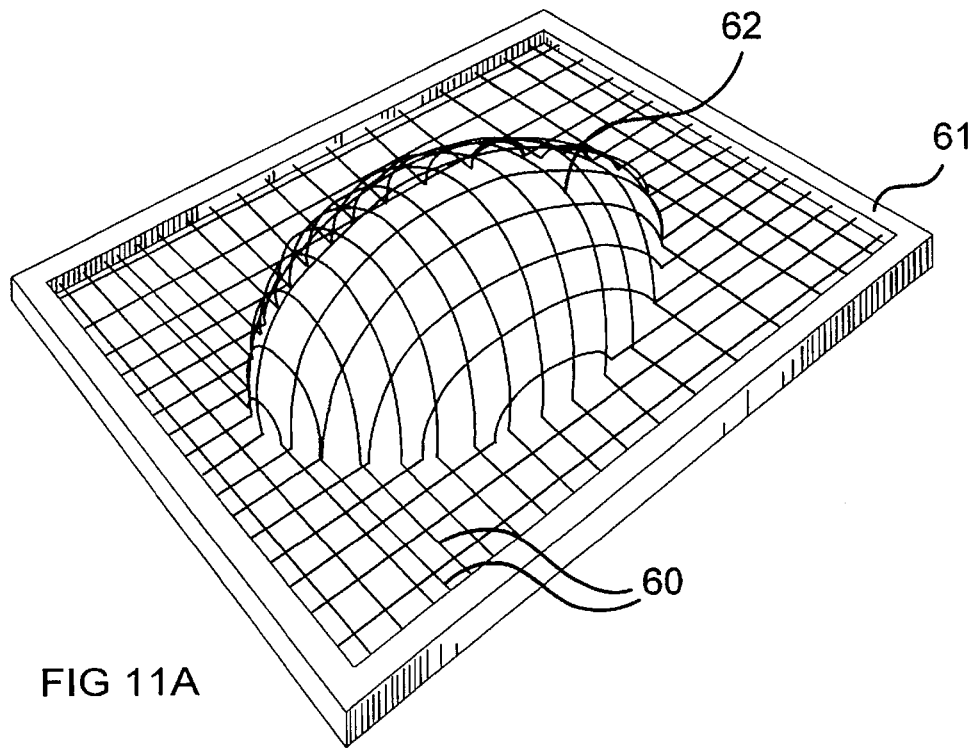
FIG. 11A is a perspective view of a formed network of foam burning wires.
Figure 11B:
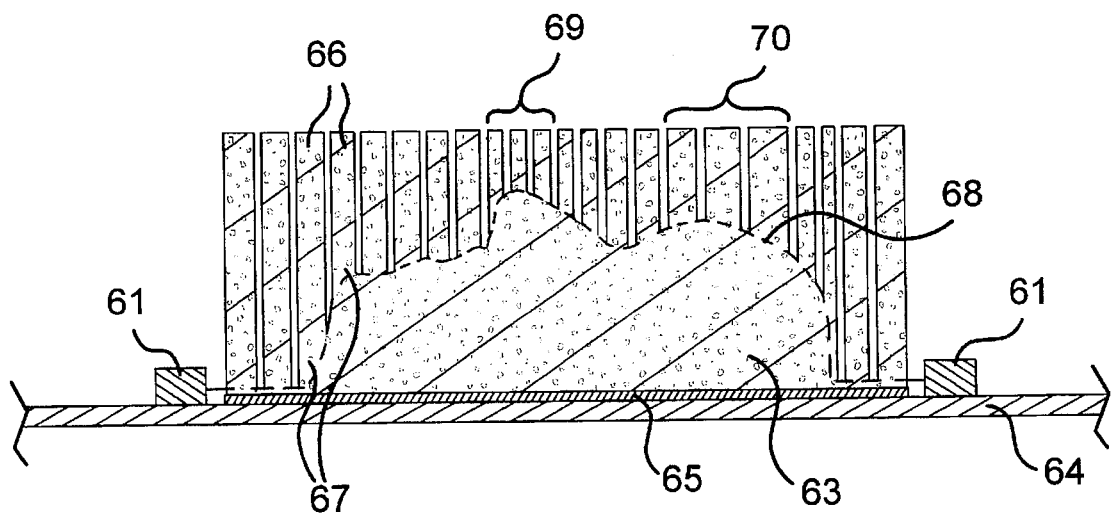
FIG. 11B is a cross-sectional diagrammatic view of the network of FIG. 11A engaging a mounted foam slab.

Alternatively, as shown in FIGS. 11A–11B, carving complex shapes into the surface of the foam slab may be accomplished by a grid-like network of ribbon-style blades or heated wires 60 mounted across an open frame 61. The wires outline a complex surface 62 which will form the shape to be carved into the foam slab 63. The frame is then lowered onto the foam 63 which is mounted onto a table or other flat surface 64 through attachment means such as an adhesive layer 65. The heated wires or blades cut a plurality of quadrangular, (French-fry like) columns 66 into the slab. While engaged, and still heated, the network is oscillated in directions perpendicular to the direction of the initial lowering of the frame. This action cuts the base 67 at each column. The desired fidelity or smoothness of the surface may be controlled by the size of the grid openings with relation to the overall size and shape of the surface being cut. As in the example of FIGS. 12 and 13, the blades or wires can define complex three-dimensional shapes.

In complex surfaces such as that of a face 68, as shown in FIG. 11B, regions of relatively greater detail such as the nose 69 may require more densely packed carving elements than in regions of less detail 70. Voids may be cut in much the same manner.

For strength and durability, the envelope 3 is preferably made of urethane film or sheet material in a thickness of 100 to 300 microns (4 to 12 mils) having high flexibility and a very soft and smooth surface. In large structures or structures where cost is a concern, a vinyl film, fabric, or other sheet material may be indicated.

In the preferred embodiment, the envelope or skin 3 consists of two sheets 21 and 22. The first one is molded or formed to intimately match the surface outline of the top and sides of the core 2.

The first, orginally flat sheet 21 is laid over the opening of a mold 23 which forms a matrix 24 corresponding to that outline. After the peripheral edge 25 of the sheet has been secured to the edges 26 of the mold, the sheet 21 is sucked into the mold by suction applied to a manifold 27 leading to a plurality of small apertures 28 in the internal surface of the mold. Depending upon the material used in the sheet 21, the sheet material may have to be heated prior to applying the suction to eliminate most of the resiliency of the sheet material, and thus upon cooling the sheet will retain its molded shape. The foam core 2 is then inserted upside down into the matching mold until its top and side surfaces are in intimate contact with the formed sheet 21. A second sheet of urethane, or any other airtight material having dimensions slightly larger than the undersurface of the foam core, is then laid over it. The peripheral edge 29 of the second sheet 22 is then welded or bonded to the peripheral edge 25 of the first sheet 21 to close the envelope. Any excess material is trimmed away. The vacuum or suction force applied to the mold is removed. Any resiliency remaining in the material of the first sheet 21 draws that sheet tightly over the foam core 2 to form a taut and smooth surface. Depending upon the nature of the structure, a stiffening board 30 made of plastic or cardboard may be inserted between the base of the foam core 2 and the bottom sheet 22. Alternately, the bottom sheet 22 may be made of a rigid, rather than a pliable sheet material. It should also be understood that the edge 25 of the first sheet could be bonded to any other surface such as the face of a display panel when constructing three dimensional advertising displays, or to a cover or page of a book, greeting card or other such article. In some cases, using a dual process, two first sheets 21 and two central cores 2 having symmetrical or different dimensions but matching peripheries, can be bonded together back-to-back. It should also be understood that in the manufacture of self-inflating structures having very complex geometries, one or both sheets can be a composite of various pieces of rigid and flexible materials joined together prior to being fitted around the foam core.

Prior to being formed into the mold, the first sheet 21 may be textured by lamination, surface bonding of fibers or fabric, spraying, and other such texturing processes.

The envelope or skin can also be fabricated by a rotational molding process whereby a plastic or latex material is introduced into a mold formed of two mating sections. The mold is heated to liquefy the plastic material, then spinned about two perpendicular axes in order to spread a fine coat of the plastic material against the walls of the mold under centrifugal forces. After a cooling and curing period, the mating sections of the mold are separated to retrieve the molded envelope. The envelope may have to be cut to allow insertion of the core mold, or to separate the two halves of the envelope. In another process, the liquid plastic material is sprayed or painted against the walls of a mold and allowed to cure before the foam core is introduced into it.

Graphics may be preprinted on the outside surface of the envelope by painting or silk-screening, or by passing it through a rotative printing press. The graphics being applied to the envelope may be distorted to take into account the stretching of the skin which occurs in the above-described molding process. Alternately, the texturing or painting of the envelope may take place after final assembly of the inflatable structure.

In order to assure a tight adherence of the skin 3 to all areas of the core foam, it might be necessary to apply a bonding agent to negative surfaces of the core such as the bottom surface 31 of a cavity. One may also allow the skin to cure or harden in contact with the foam core in order to bond the two together. The bonding between areas of the foam core and the envelope can be achieved by placing sheets of heat-activatable polyester or polyamide or other type of meltable adhesives and heating said adhesive sheet before inserting the foam core. A liquid adhesive can also be sprayed in or brush-applied where desired. Alternately, the skin may have heat-activatable adhesive backing.

The air-bleeding may be done through a single aperture 4 or multiple holes. The aperture may be fitted with a releasable valve welded into the skin. Alternately, the aperture may be sealed with other types of sealing means including a peelable section of adhesive tape.

The aperture 4 need not be closed or sealed when the structure is compressed flat between, for example, the cover of a book-like structure held closed by a clasp or corner hook-and-vanes cloth fasteners 45, 46 where the structure is only allowed to expand or inflate when the two covers are separated. In such a case, it might be advantageous to have a row of small apertures along an edge of the self-inflating structure opposite the back of the book or the hinged edges of the pressing plates. Alternately, the skin may be made of a breathing sheet-material such as a woven fabric. In this way, spaces between the fibers of the fabric form a multitude of apertures. Similarly, the self-inflating structure pressed-squeezed or rolled into a compact shape which is then inserted into a tightly fitting container or secondary envelope needs no sealable aperture. The structure will automatically self-inflate when the container or envelope is opened or when the structure is pulled out of it.

In some applications, it may be preferable to bleed the air inside the self-inflating structure through a controllable valve by vacuum suction, and thus collapse the structure without use of external pressing mechanisms. The structure will remain in its collapsed state so long as the valve is closed, and will automatically reinflate when the valve is reopened.

Figure 7:
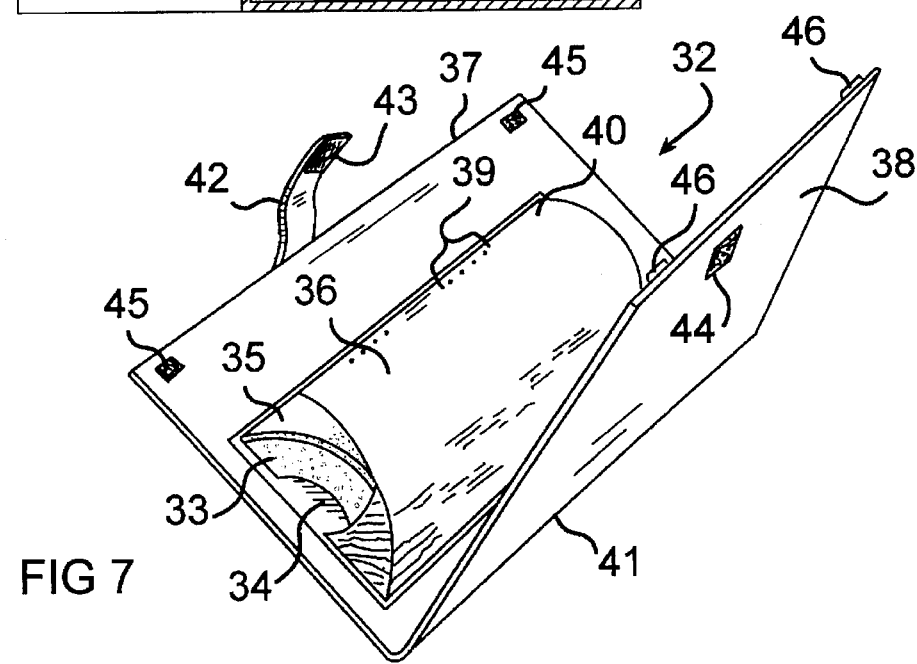
FIG. 7 is a perspective view of an examplary application of the invention.
Figure 9:
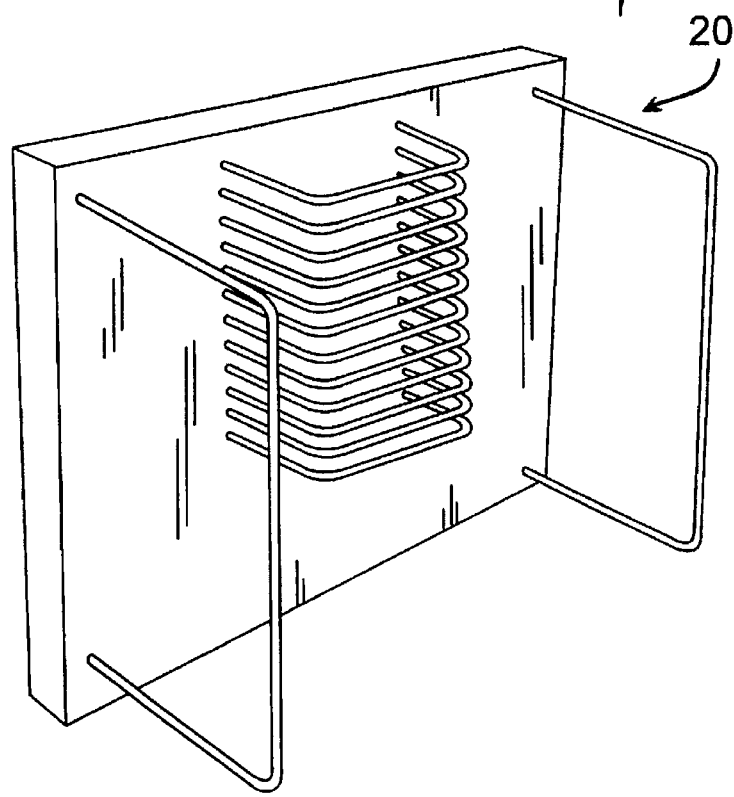
FIG. 9 is a perspective view of a set of foam burning wires.

In the example illustrated in FIG. 7, manufactured according to the invention, a semi-cylindrical self-inflating structure 32 having a length of approximately 18 centimeters (7 inches) and a height or radius of 5 centimeters (2 inches) consists of a central core 33 of polyether, polyurethane, reticulated foam having a pore count of about 4 pores per linear centimeter (10 pores per linear inch), having in its flat side a semi-cylindrical cavity 34 with a radius of 2.5 centimeters (1 inch). A 0.5 centimeters (0.2 inch), thin padding layer of a similar material having a pore count of 20 pores per linear centimeter (50 pores per linear inch) is inserted between the envelope 36 and the central core 33. The envelope 36 is made from urethane sheet material 100 microns (4 mils) thick. The self-inflating structure is bonded to the inside face of one of two hinged rigid covers 37, 38. A series of pin-hole apertures 39 are lined along the longitudinal edge 40 of the structure opposite the hinge 41 joining the two covers 37, 38. The covers were closed, and held together by a strap 42 secured by cooperating patches 43, 44 of hook-and-vanes type fabric fasteners, or by mating sets of similar patches 45, 46 positioned against the inside surface of the covers open sides. The structure 32 was held compressed to a thickness of 0.6 centimeters (0.15 inch) corresponding approximately to 7.5% of its full inflated volume for 12 months. After which the structure 32 was allowed to reinflate by separating the two covers 37, 38. Whereupon it returned to its full inflated original volume in 30 minutes.

Figure 12:
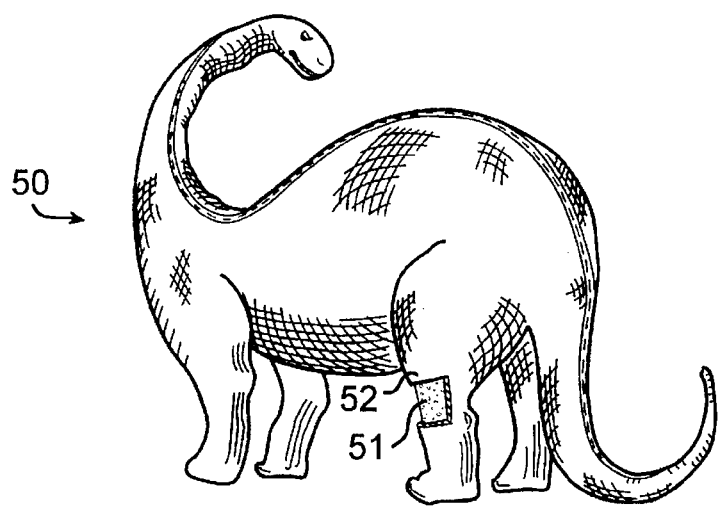
FIG. 12 is a perspective view of a self-inflating toy according to the invention.
Figure 13:
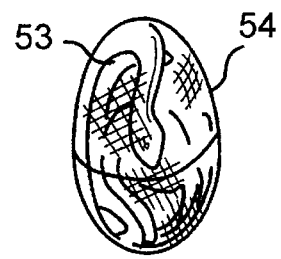
FIG. 13 is a perspective view of the toy compressed in its container.

In the example illustrated in FIGS. 12 and 13, a self-inflating toy 50 in the shape of a dinosaur has a core 51 carved from a slab of H220-47 type, FOAMEX brand of HR foam having a 25% IFD between 43 and 50 and a 50% Compression Set of less than 10. The skin 52 is made of woven cotton fabric appropriately cut and sewn to intimately mold the core 51. The toy is squeezed and rolled into a compact shape 53 not exceeding 10% or more preferably, of its original uncompressed volume, then confined into a egg-shaped container 54 illustrated as transparent in FIG. 13. Acceptable compaction may range from 5% to 20% of the original uncompressed volume, depending on the structure, the size at its internal void, and its purpose. The performance trade-off between compactibility on the one hand and structural integrity in the uncompressed state on the other hand, must be balanced according to the application. After confinement in the container for approximately six months, the toy will regain 95% of its original volume within 24 hours.

While the preferred embodiments of the invention have been described, modifications can be made and other embodiments may be devised without departing from the spirit of the invention and the scope of the appended claims.

What is claimed is:

1. A process for making a self-inflating copy of a three-dimensional structure which comprises:
   selecting at least one block of open-cell, resiliently compressible foam material;
   shaping at least one portion of said block into an image of said structure;
   making an envelope having at least one opening with at least one pliable sheet of material around said block;
   collapsing said envelope and block by removing fluid held therein; and
   constraining said envelope and block into a collapsed state;
   wherein said step of making said envelope comprises:
   selecting a first of said pliable sheet and at least one additional sheet;
   forming said first pliable sheet into a soft and pliable cradle shaped and dimensioned to intimately contact a surface area of the shaped portion of said block;
   placing said block between said first and said at least one additional sheet; and
   bonding peripheral areas of said first sheet to said at least one additional sheet around said block.

2. The process of claim 1, wherein said step of placing comprises:
   positioning said surface area of the shaped portion into said cradle; and
   covering surface portions of said block, uncontacted by said first pliable sheet, with a rigid sheet.

3. The process of claim 2, wherein the step of forming said first sheet comprises:
   lining a molding cavity with said first sheet.

4. The process of claim 3, wherein the step of lining comprises vacuum-pulling a section of said first sheet into said molding cavity.

5. The process of claim 3, wherein the step of lining comprises spraying a layer of material curable to an airtight sheet into said molding cavity.

6. The process of claim 3, wherein the step of lining comprises applying a layer of material curable to an airtight sheet into said molding cavity.

7. The process of claim 6, wherein the step of applying comprises spreading said curable material by rotational molding.

8. The process of claim 2, which further comprises closing said opening with a releasable seal.

9. The process of claim 2, wherein the step of positioning comprises bonding part of said first sheet to said surface portion.

10. The process of claim 1, which further comprises:
    forming said at least one additional sheet into a second cradle shaped and dimensioned to intimately cover said surface portions of said block which are uncontacted by said first pliable sheet.

11. The process of claim 1 wherein the step of shaping said block comprises machining said block.

12. The process of claim 1, wherein the step of shaping said block comprises carving away unwanted portions of said block.

13. The process of claim 12, wherein the step of carving away comprises slicing said unwanted portion with at least one blade.

14. The process of claim 13, wherein the step of carving away further comprises slicing said unwanted portions with patterned sets of blades.

15. The process of claim 12, wherein the step of carving away comprises cutting said unwanted portions with at least one heated heating element.

16. The process of claim 15, wherein the step of carving away said unwanted portions further comprises cutting said unwanted portions with patterned sets of heated wires.

17. The process of claim 1, wherein the step of shaping said at least one block comprises selecting a block of reticulated foam.

18. The process of claim 1, wherein the step of shaping said block comprises applying a heated mold to at least a portion of said block.

19. The process of claim 1, wherein the step of forming said first pliable sheet comprises marking said sheet before forming it into said first cradle.

20. The process of claim 1, wherein the step of shaping said block comprises creating at least one void cavity within said structure.

21. The process of claim 1, wherein the step of shaping said block comprises forming at least one depression into a surface of said block.

22. The process of claim 1, wherein said step of collapsing said envelope and block comprises pressing said envelope and block.

23. The process of claim 1, wherein said step of constraining comprises placing said envelope and block into a container.

24. The process of claim 1, wherein said step of collapsing comprises exposing said envelope and block to a vacuum source.

25. A process for making a self-inflating structure which comprises:
    shaping at least one block of open-cell, resiliently compressible foam material;
    making an envelope having at least one opening with at least one pliable sheet of airtight material around said block including readying a first of said pliable sheet and a second sheet made of airtight material, forming said first sheet into a first cradle shaped and dimensioned to intimately contact a surface portion of said block;
    positioning said surface portion into said first cradle and covering uncontacted surface portions of said block with said second sheet; and
    bonding peripheral areas of said first sheet to said second sheet around said block; and
    pressing said envelope and block to expel fluid contained therein through said opening;
    wherein the step of shaping said at least one block comprises:
    forming a slab of a first resiliently compressible, open-cell foam material having a first pore count;
    covering a surface portion of said slab with a layer of a second resiliently compressible, open-cell foam material having a higher pore count than said first foam material.

26. A process for making a self-inflating copy of a three-dimensional structure which comprises:
    selecting at least one block of open-cell, resiliently compressible foam material;
    shaping at least one portion of said block into an image of said structure;
    making an envelope having at least one opening with at least one pliable sheet of material around said block;
    collapsing said envelope and block by removing fluid held therein;

wherein said step of making said envelope comprises:

selecting a first of said pliable sheet and a second at least one additional sheet;

forming said first pliable sheet into a soft and pliable cradle shaped and dimensioned to intimately contact a surface area of the shaped portion of said block;

placing said block between said first and said at least one additional sheet;

bonding peripheral areas of said first sheet to said at least one additional sheet around said block; and wherein said step of placing comprises:

positioning said surface area of the shaped portion into said cradle; and covering surface portions of said block, uncontacted by said first pliable sheet, with a rigid sheet.

* * * * *